United States Patent
Manta et al.

(10) Patent No.: US 10,823,284 B2
(45) Date of Patent: Nov. 3, 2020

(54) POWER TRANSMISSION CONTROL DEVICE

(71) Applicant: AISIN AW CO., LTD., Anjo-shi, Aichi-ken (JP)

(72) Inventors: Hideto Manta, Nishio (JP); Mitsutoshi Kamiya, Nishio (JP)

(73) Assignee: AISIN AW CO., LTD., Anjo-Shi, Aichi (JP)

( * ) Notice: Subject to any disclaimer, the term of this patent is extended or adjusted under 35 U.S.C. 154(b) by 0 days.

(21) Appl. No.: 16/471,597

(22) PCT Filed: Dec. 27, 2017

(86) PCT No.: PCT/JP2017/047049
§ 371 (c)(1),
(2) Date: Jun. 20, 2019

(87) PCT Pub. No.: WO2018/124218
PCT Pub. Date: Jul. 5, 2018

(65) Prior Publication Data
US 2020/0132190 A1   Apr. 30, 2020

(30) Foreign Application Priority Data
Dec. 27, 2016   (JP) ................................. 2016-253212

(51) Int. Cl.
*F16H 61/32*   (2006.01)
*B60L 50/16*   (2019.01)
(Continued)

(52) U.S. Cl.
CPC ............... *F16H 61/32* (2013.01); *B60K 6/36* (2013.01); *B60L 15/20* (2013.01); *B60L 50/16* (2019.02);
(Continued)

(58) Field of Classification Search
CPC .......... F16H 61/32; B60L 50/16; B60L 15/20; B60K 6/36; B60W 10/06; B60W 10/08; B60W 10/10; F02D 29/06; F16F 15/12
See application file for complete search history.

(56) References Cited

U.S. PATENT DOCUMENTS

2003/0074998 A1   4/2003   Esly et al.

FOREIGN PATENT DOCUMENTS

| EP | 1 564 449 A2 | 8/2005 |
|---|---|---|
| JP | 2003-529024 A | 9/2003 |
| JP | 2005-226687 A | 8/2005 |

OTHER PUBLICATIONS

U.S. Appl. No. 16/471,599, filed Jun. 20, 2019, Manta et al.
(Continued)

*Primary Examiner* — Zakaria Elahmadi
(74) *Attorney, Agent, or Firm* — Buchanan Ingersoll & Rooney PC (57) ABSTRACT

Provided is a power transmission control device capable of reliably performing engagement between an engagement member and a target engagement member, by operating the engagement member to slide by an actuator having an elastic member deformed by transmitting a load received by the engagement member. An actuator has an elastic member, and a control unit calculates the differential rotation between an engagement member and target engagement members on the basis of the detected rotation speeds of a first rotation shaft and a second rotation shaft, and makes differential rotation coincide with a predetermined differential rotation by adjusting the rotation speed of power sources. After the differential rotation coincides with the predetermined differential rotation, in establishing the engagement, the predetermined differential rotation sets the differential rotation on the basis of a natural frequency generated in conjunction (Continued)

between the actuator and the engagement member by the elastic member.

6 Claims, 4 Drawing Sheets

(51) Int. Cl.
| | |
|---|---|
| *B60K 6/36* | (2007.10) |
| *B60L 15/20* | (2006.01) |
| *B60W 10/06* | (2006.01) |
| *B60W 10/08* | (2006.01) |
| *B60W 10/10* | (2012.01) |
| *F02D 29/06* | (2006.01) |
| *F16F 15/12* | (2006.01) |
| *F16H 61/28* | (2006.01) |

(52) U.S. Cl.
CPC ............ *B60W 10/06* (2013.01); *B60W 10/08* (2013.01); *B60W 10/10* (2013.01); *F02D 29/06* (2013.01); *F16F 15/12* (2013.01); *F16H 2061/2892* (2013.01)

(56) References Cited

OTHER PUBLICATIONS

U.S. Appl. No. 16/471,763, filed Jun. 20, 2019, Shimizu et al.
U.S. Appl. No. 16/471,800, filed Jun. 20, 2019, Inoue et al.
International Search Report (Form PCT/ISA/210) dated Mar. 20, 2018, by the Japanese Patent Office in corresponding International Application No. PCT/JP2017/047049. (6 pages).
Notification of Transmittal of Translation of the International Preliminary Report on Patentability (Form PCT/IB/338 and PCT/IB/373) dated Jul. 11, 2019 and the Written Opinion of the International Searching Authority (Form PCT/ISA/237) dated Mar. 20, 2018, by the International Bureau of WIPO in corresponding International Application No. PCT/JP2017/047049. (11 pages).

POWER TRANSMISSION CONTROL DEVICE

TECHNICAL FIELD

The present invention relates to a power transmission control device mounted on a vehicle.

BACKGROUND ART

In related art, there is known a power transmission control device that includes a first rotation shaft, a power source provided to be able to adjust the rotation speed of the first rotation shaft, a second rotation shaft that rotates in conjunction with an axle, a first rotation speed detection unit that detects the rotation speed of the first rotation shaft, a second rotation speed detection unit that detects the rotation speed of the second rotation shaft, an engagement member that rotates integrally with one shaft of the first rotation shaft and the second rotation shaft and is provided to be movable in an axial direction with respect to the one shaft, a target engagement member which is provided to be relatively rotatable with respect to the one shaft and rotates in conjunction with the other shaft of the first rotation shaft and the second rotation shaft, and an actuator that operates to move the engagement member in the axial direction.

Furthermore, in order to reduce the impact generated when the engagement member moves in the axial direction and collides with the target engagement member, a power transmission control device disclosed in Patent Literature 1 that performs a control of reducing the speed of the movement immediately before the impact is known.

Further, as another example for reducing the impact noise, a power transmission control device disclosed in Patent Literature 2 in which an elastic member deformed by transmitting a load received by the engagement member is provided in the actuator is also known.

CITATION LIST

Patent Literature

Patent Literature 1: JP 2005-226687 A
Patent Literature 2: JP 2003-529024 W

SUMMARY OF INVENTION

Technical Problem

However, in the power transmission control device of Patent Literature 2, in some cases, in a relation between a differential rotation between the engagement member and the target engagement member, and a natural frequency generated in conjunction between the actuator and the engagement member, a phenomenon in which the engagement between the engagement member and the target engagement member is interrupted may occur, and the engagement between the engagement member and the target engagement member may not be completed.

An object of the present invention is to provide a power transmission control device capable of reliably performing the engagement between the engagement member and the target engagement member, by operating the engagement member to slide by an actuator having an elastic member deformed by transmitting a load received by the engagement member.

Solution to Problem

To solve the above problems, there is provided a power transmission control device including: a first rotation shaft; a power source provided to be able to adjust a rotation speed of the first rotation shaft; a second rotation shaft which rotates in conjunction with an axle; a first rotation speed detection unit which detects the rotation speed of the first rotation shaft; a second rotation speed detection unit which detects a rotation speed of the second rotation shaft; an engagement member which rotates integrally with one shaft of the first rotation shaft and the second rotation shaft and is provided to be movable in an axial direction with respect to the one shaft; a target engagement member which is provided to be relatively rotatable with respect to the one shaft and rotates in conjunction with the other shaft of the first rotation shaft and the second rotation shaft; an actuator which operates to move the engagement member in the axial direction; and a control unit, in which the control unit is configured to be able to execute a differential rotation calculation process for calculating differential rotation between the engagement member and the target engagement member on the basis of the rotation speed of the first rotation shaft detected by the first rotation speed detection unit and the rotation speed of the second rotation shaft detected by the second rotation speed detection unit, a differential rotation control process for making the differential rotation coincide with a predetermined differential rotation by adjusting a rotation speed of the power source, and an engagement control process for operating the actuator to establish the engagement between the engagement member and the target engagement member, after the differential rotation coincides with the predetermined differential rotation by the differential rotation control process, the actuator has an elastic member which is deformed by transmitting a load received by the engagement member, and the rotation speed of the power source is adjusted so that the differential rotation coincides with the predetermined differential rotation which is set on the basis of a natural frequency generated in conjunction between the actuator and the engagement member by the elastic member, at the time of execution of the differential rotation control process.

The engagement member and the target engagement member may be configured to engage with each other by spline coupling, at the time of execution of the differential rotation control process, the control unit may execute a frequency calculation process for calculating a spline frequency which is a value obtained by multiplying an absolute value of the difference rotation by the number of spline teeth of the spline coupling, and the control unit may set the predetermined differential rotation so that a value after a decimal point of a value obtained by dividing the spline frequency calculated by the frequency calculation process by the natural frequency does not become 0.

The control unit may be configured to be able to execute a rotation acceleration calculation process for calculating a rotation acceleration of the second rotation shaft, which is an amount of change per unit time from the rotation speed of the second rotation shaft, at the time of execution of the differential rotation control process, the control unit may set the predetermined differential rotation so that a value obtained by dividing the spline frequency calculated by the frequency calculation process by the natural frequency is greater than a predetermined integer which is one of 0 and a positive integer, and is equal to or less than a value obtained by adding 0.5 to the predetermined integer, when the rotation acceleration of the second rotation shaft calculated by the rotation acceleration calculation process is a positive value, and the control unit may set the predetermined differential rotation so that a value obtained by dividing the spline frequency calculated by the frequency calculation process by the natural frequency is equal to or greater than a value obtained by adding 0.5 to a predetermined integer among 0 and a positive integer and is smaller than a value obtained by adding 1.0 to the predetermined integer, when the rotation acceleration of the second rotation shaft calculated by the rotation acceleration calculation process is a negative value.

The actuator may have a motor which drives the actuator, and a power transmission control device may include a current monitoring unit which monitors a current flowing through the motor, and a storage unit, the control unit may be configured to be able to execute a frequency storage process for detecting a frequency of the current and storing the frequency in the storage unit, when a periodic vibration having a predetermined amplitude occurs in the current monitored by the current monitoring unit, while operating the actuator so that the engagement member and the target engagement member are engaged at the time of execution of the engagement control process, and the control unit may perform correction of the predetermined differential rotation on the basis of the frequency of the current stored by the vibration storage process, at the time of execution of the differential rotation control process.

Advantageous Effects of Invention

In making the differential rotation between the engagement member and the target engagement member coincide with a predetermined differential rotation for the purpose of engaging the engagement member and the target engagement member, since the predetermined differential rotation is set on the basis of the natural frequency generated in conjunction between the actuator and the engagement member by the elastic member, an occurrence of the phenomenon of interfering with the engagement between the engagement member and the engagement member can be easily prevented to reliably perform the engagement of both.

BRIEF DESCRIPTION OF DRAWINGS

FIG. 1 is a power transmission configuration diagram of a power transmission control device to which the present invention is applied.

FIG. 3 is a conceptual diagram conceptually illustrating the main part configuration of an actuator.

DESCRIPTION OF EMBODIMENTS

Figure 2A:
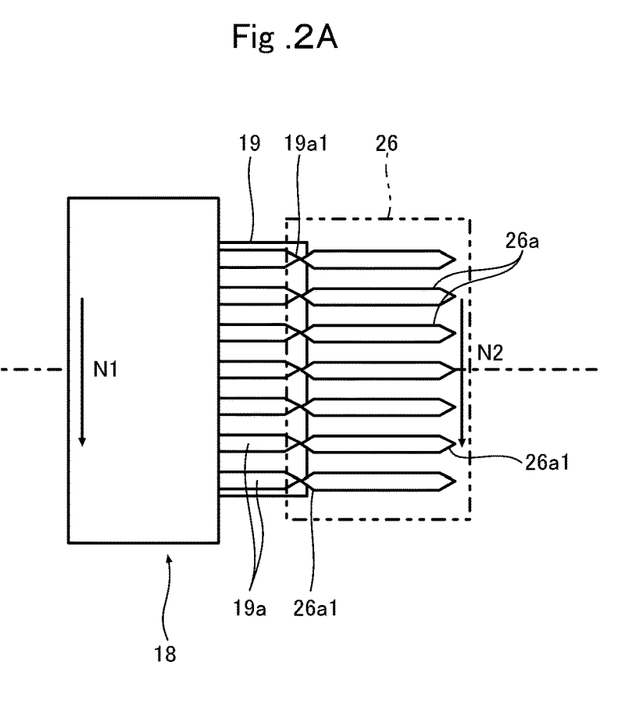
FIG. 2(A) is an enlarged view of a low-speed input gear and a sleeve in a state in which an up-lock occurs.
Figure 2B:
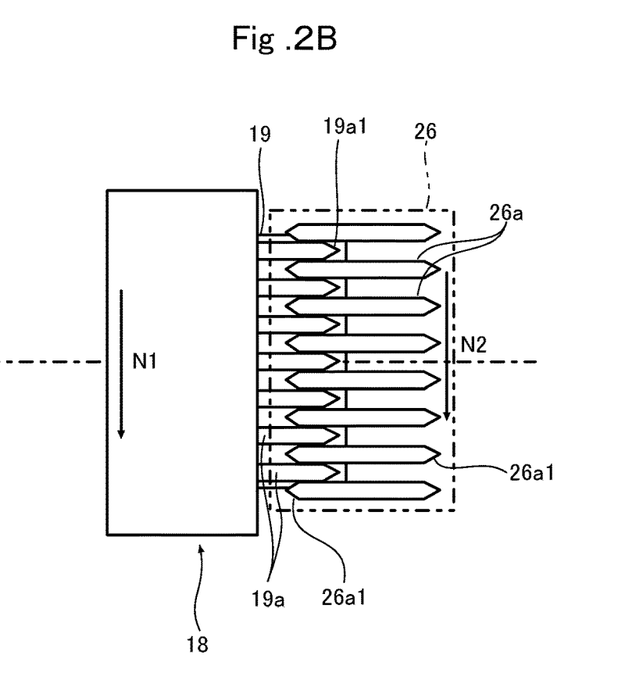
FIG. 2(B) is an enlarged view of a spline-coupled low-speed input gear and a sleeve.

FIG. 1 is a power transmission configuration diagram of a power transmission control device to which the present invention is applied, FIG. 2(A) is an enlarged view of a low-speed input gear and a sleeve in a state in which an up-lock occurs, and FIG. 2(B) is an enlarged view of a spline-coupled low-speed input gear and the sleeve. A power transmission control device 1 is mounted on a vehicle such as a private vehicle and controls the power transmission to a pair of right and left wheels 3 and 2 of the vehicle.

The power transmission control device 1 includes a first rotation shaft 4, a second rotation shaft 8 that rotates in conjunction with axles 6 and 7, an engine 11 provided to output the power to the first rotation shaft 4 to be able to adjust the rotation speed of the first rotation shaft 4, a motor generator 12 provided to be able to adjust the rotation speed of the first rotation shaft 4, and a switching mechanism 14 which performs the connection and disconnection switching of the power transmission between the first rotation shaft 4 and the second rotation shaft 8.

The engine 11 and the first generator 12 are examples of a power source. The motor generator 12 can adjust the rotation speed with higher accuracy than the engine 11.

The switching mechanism 14 includes a hub 17 mounted to rotate integrally with the first rotation shaft 4, a pair of input gears 18 and 21 mounted on the first rotation shaft 4 in a free rotation state, a pair of output gears 23 and 24 mounted to rotate integrally with the second rotation shaft 8, and a sleeve 26 mounted to rotate integrally on the outer periphery of the hub 17 and slidable in the axial direction of the first rotation shaft 4.

One of the pair of input gears 18 and 21 is a small diameter low-speed input gear 18, and the other thereof is a large diameter high-speed input gear 21. The hub 17 is disposed between the pair of input gears 18 and 21. One of the pair of output gears 23 and 24 is a large diameter low-speed output gear 23 always meshing with the low-speed input gear 18, and the other thereof is a small diameter high-speed output gear 24 always meshing with the high-speed input gear 21.

Pieces 19 and 22 protruding toward the hub 17 are integrally formed on the input gears 18 and 21, respectively. In other words, the hub 17 is disposed so as to be sandwiched between the pair of pieces 19 and 22 and is adjacent to both of them.

Spline teeth 26 a are formed at equal intervals, respectively, so that the outer periphery of the hub 17 and the inner periphery of the sleeve 26 are engaged by spline coupling. Spline teeth 19 a are also formed on the outer periphery of each of the pieces 19 and 22 at mutually equal intervals, so as to spindle-couple with the inner periphery of the sleeve 26 and engage in an engageable and disengageable manner. Incidentally, FIG. 2 illustrates a state of the low-speed input gear 18 and the sleeve 26, but the state of the high-speed input gear 21 and the sleeve 26 is also the same.

When the sleeve 26 moves to slide toward the low-speed input gear 18, the outer periphery of the piece 19 of the low-speed input gear 18 and the inner periphery of the sleeve 26 are spline-coupled, and the low-speed input gear 18 including the piece 19 rotates integrally with the hub 17 and the sleeve 26. This state is a low-speed state in which the power of the first rotation shaft 4 is transmitted to the second rotation shaft 8 at low speed.

When the sleeve 26 moves to slide toward the high-speed input gear 21, the outer periphery of the piece 22 of the high-speed input gear 21 and the inner periphery of the sleeve 26 are spline-coupled, and the high-speed input gear 21 including the piece 22 rotates integrally with the hub 17 and the sleeve 26. This state is a high-speed state in which the power of the first rotation shaft 4 is transmitted to the second rotation shaft 8 at high speed.

When the sleeve 26 moves to slide to an engagement release position between the adjacent pair of pieces 19 and 22, the sleeve 26 is not spline-coupled to either of the pair of pieces 19 and 22, and the power of the first rotation shaft 4 enters an engagement release state in which the power of the first rotation shaft 4 is not transmitted to the second rotation shaft 8.

That is, the switching mechanism 14 also performs gear change switching in the connected state as well as the connection and disconnection switching. Further, by the aforementioned configuration, the two pieces 19 and 22 and the sleeve 26 constitute dog clutches 27 and 28 for connecting and disconnecting the power by spline coupling and coupling release. In other words, the sleeve 26 is a type of axially slidable engagement member, and the pieces 19 and 22 are a type of target engagement member.

An engagement completion position at which the sleeve 26 is completely spline-coupled with the pieces 19 and 22 of the input gears 18 and 21 is respectively set to be close to both ends within the sliding range of the sleeve 26. When the sleeve 26 is caused to slide to be closer to the end than the engagement completion position in the sliding range, there is a pressing completion state in which the sleeve 26 is pressed against a stopper (not illustrated).

Between the engagement completion position and the engagement release position within the sliding range of the sleeve 26, an engagement start position which is an engagement start state in which the sleeve 26 and the spline teeth 19a and 26a of the pieces 19 and 22 are in contact with each other and power is not transmitted is set.

Incidentally, although the hub 17 and the sleeve 26 are always spline-coupled, the sleeve 26 and the pieces 19 and 22 are not always spline-coupled, and switching is performed from one state to the other state of the released state of the spline-coupling and the spline-coupled state, and from the other state to one state thereof. For this reason, in order for the pieces 19 and 22 and the sleeve 17 to be smoothly spline-coupled in connection with the sliding of the sleeve 26, chamfers 19a1 and 26a1 pointed in a wedge shape are formed at the facing tips of the spline teeth 19a and 26a of both, respectively.

Even if one spline tooth 19a1 is not accurately located in a tooth groove formed between the other spline teeth 19a1 and 19a1, it is possible to mesh both by utilizing the action of the chamfers 19a1 and 26a1.

However, when trying to make the sleeve 26 slide to a gearing position, in a state in which the phases of the pieces 19 and 22 and the sleeve 26 completely coincide with each other, the circumferential position of the chamfer 19a1 coincides with and the rotation phase is the same, as illustrated in FIG. 2(A), an up-lock which is a phenomenon in which the tips of the chamfers 19a1 and 26a1 abut against each other to interfere with their engagement occurs.

In order to prevent the occurrence of the up-lock and execute the engagement smoothly as illustrated in FIG. 2(B), in a state in which the rotation phases of the pieces 19 and 22 and the sleeve 26 do not completely coincide with each other so that the pressing action of the chamfers 19a1 and 26a1 occurs, it is necessary to make the sleeve 26 slide to the engagement completion position.

Further, when a differential rotation ΔN which is a rotation speed difference between a rotation speed N1 of the pieces 19 and 22 and a rotation speed N2 of the sleeve 26 is large, since the rotation phase relation between the pieces 19 and 22 and the sleeve 26 is basically unstable, it is difficult to perform smoothly engagement between the pieces 19 and 22 and the sleeve 26. On the other hand, when the differential rotation ΔN is set to 0, the up-lock occurs when the rotation phases of the pieces 19 and 22 and the sleeve 26 completely coincide with each other.

That is, a control is performed such that the differential rotation ΔN coincides with a predetermined differential rotation which is a value sufficiently smaller than the rotation speed N1 and the rotation speed N2 and is a preset value at a value greater than zero. Such a control is executed by the control unit 29 illustrated in FIG. 4. The slide operation of the sleeve 26 is performed by an actuator 31 illustrated in FIG. 3.

The power of the second rotation shaft 8 is transmitted to a differential mechanism 34 via a drive gear 32 and a driven gear 33. The differential mechanism 34 distributes the power from the second rotation shaft 8 to the right and left axles 7 and 6. Incidentally, the right and left wheels 3 and 2 may be rear wheels or front wheels of the vehicle.

FIG. 3 is a conceptual view conceptually illustrating the main part configuration of the actuator. The actuator 31 includes a shift shaft 36, an electric motor 37 for rotationally driving the shift shaft 36 about an axis, an inner lever 38 mounted on the shift shaft 36 and swinging integrally with the shift shaft 36, and a shift fork (not illustrated) interlocked with the swinging operation of the inner lever 38 and the slide operation of the sleeve 26.

That is, in the actuator 31, the rotation about the axis of the shift shaft 36 is converted into an operation of causing the sleeve 26 to slide.

A configuration in which the shift shaft 36 is rotated about its axis by the drive force of the motor 37 will be described. The drive force of the electric motor 37 is converted into an operating force for causing the sleeve 26 to slide, by a gear 39 provided on an output shaft 37a of the motor 37, a gear 41 always meshing with the gear 39, a gear 43 mounted on a rotation shaft 42 of the gear 41, and a gear 44 always meshing with the gear 43 and mounted to rotate integrally with the shift shaft 36.

A damper mechanism 46 is provided between the motor 37 and the sleeve 26. The damper mechanism 46 is a type of elastic member which is elastically deformed by transmitting a load such as an impact received by the sleeve 26, and cushioning, reduction or the like of an impact sound can be achieved accordingly.

Specifically, the rotation shaft 42 is constituted by two divided pieces 42a and 42b. The gear 41 is mounted on one divided piece 42a, and the gear 43 is mounted on the other divided piece 42b. Normally, the two divided pieces 42a and 42b rotate integrally, by the elastic force of the damper mechanism 46.

Further, when a predetermined impact or more acts on the divided piece 42b as a rotational force, the divided piece 42b relatively rotates with respect to the divided piece 42a against the elastic force, and the impact thereof is absorbed.

Incidentally, when a natural vibration period T2 of the sleeve 26 in the slide direction provided by the elastic force of the damper mechanism 46 is synchronized with an occurrence period T1 at which the up-lock occurs, the up-lock occurs continuously and periodically, and the shift operation is not completed quickly.

A spline frequency F1 which is a reciprocal of the occurrence period T1 is calculated from the following formula.

$$F1 = |N1 - N2| \times \text{teeth number} \qquad \text{[Formula 1]}$$

N1 is a value of the rotation speed N1, N2 is a value of the rotation speed N2, and the teeth number is the number of spline teeth 19a and 26a formed on the pieces 19 and 22 and the sleeve 26, respectively. Incidentally, the spline frequency F1 is a value indicating how many times the spline coupling can be performed in one second during rotation.

The natural frequency F2, which is the reciprocal of the natural vibration period T2, is calculated from the following formula.

$$F2 = 2\pi\sqrt{\frac{m}{k}} \quad \text{[Formula 2]}$$

m is the weight of a vibrating object, and k is the spring constant of the damper mechanism 46.

Further, when the spline frequency F1 is a value that is a natural number multiple of the natural frequency F2, the up-lock occurs continuously and periodically. The predetermined differential rotation is set to prevent such a situation. In other words, the predetermined differential rotation is set so that a value after the decimal point of the value obtained by dividing the spline frequency F1 by the natural frequency F2 does not become zero.

Figure 4:
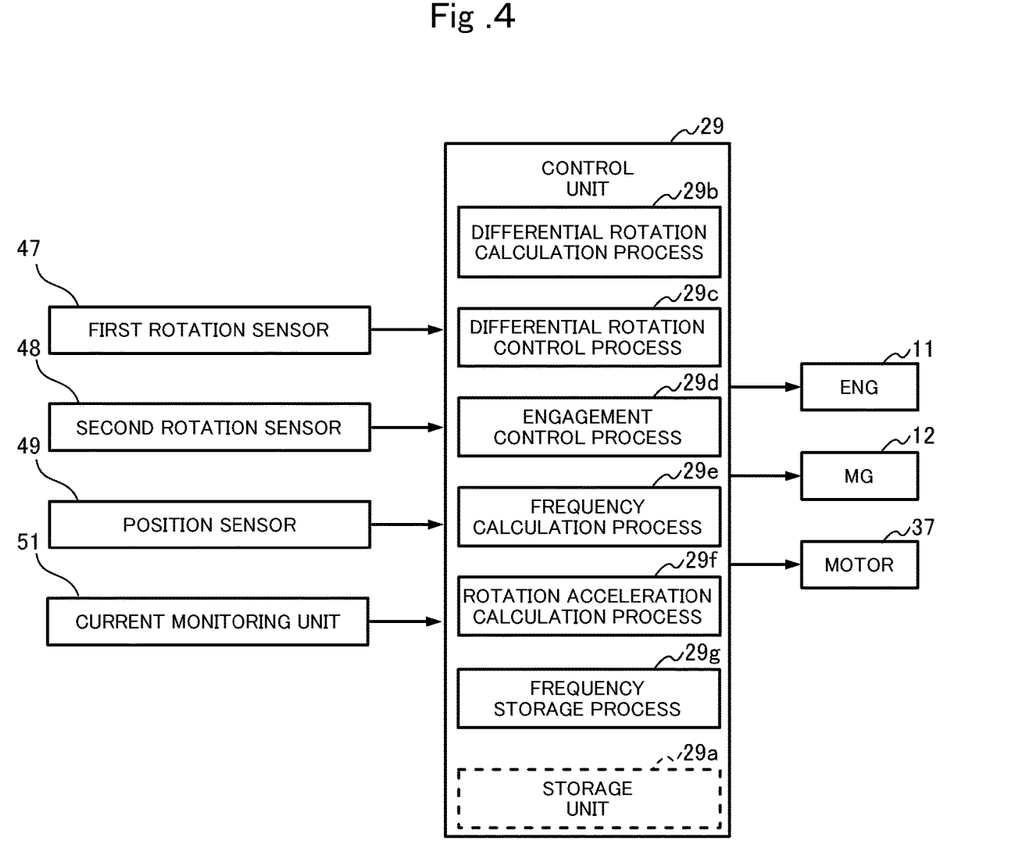
FIG. 4 is a block diagram illustrating a configuration of a control unit.

FIG. 4 is a block diagram illustrating the configuration of the control unit. The control unit 29 is configured by one microcomputer or a plurality of microcomputers interconnected by a CAN or the like. Incidentally, one of the plurality of microcomputers constituting the control unit 29 may be an ECU which is a dedicated microcomputer for controlling the engine 2.

The control unit 29 has a storage unit 29a configured by a ROM or the like. A first rotation sensor 47 which is a type of a first rotation speed detection unit for detecting the rotation speed of the first rotation shaft 4, a second rotation sensor 48 which is a second rotation speed detection unit for detecting the rotation speed of the second rotation speed 4, a position sensor 49 which is a position detection unit for detecting a slide position of the sleeve 26, and a current monitoring unit 51 which monitors and detects the current flowing through the motor 37 are connected to an input side of the control unit 29.

The position sensor 49 is configured by a potentiometer or the like disposed on an upstream side of the damper mechanism 46 in the middle of a transmission path of the drive force from the motor 37 to the sleeve 26. Specifically, a potentiometer that detects the rotation angle of the divided piece 42a corresponds to the position sensor 49.

The engine 11, the motor generator 12, and the motor 37 are connected to an output side of the control unit 29.

The control unit 29 receives a shift command caused by a change in traveling condition or a driver's operation by the receiving unit (not illustrated) during traveling of both, and performs disconnection process for the disconnection switching of the dog clutches 27 and 28 to be disconnected, when it is determined that the switching conditions from the low-speed state to the high-speed state or from the high-speed state to the low-speed state of the switching mechanism 14 are satisfied.

Subsequently, for the purpose of connection switching of the dog clutches 27 and 28 to be connected, the control unit 29 first acquires the rotation speed of the first rotation shaft 4 and the second rotation shaft 8 by the first rotation sensor 47 and the second rotation sensor 48, and executes a differential rotation calculation process 29b for calculating the differential rotation ΔN related to the dog clutches 27 and 28 to be connected from the rotation speeds.

The control unit 29 executes a differential rotation control process 29c for controlling the rotation speed N1 or the rotation speed N2 by the engine 11 or the motor generator 12 so that the differential rotation ΔN calculated by the differential rotation calculation process 29b coincides with the predetermined differential rotation. Incidentally, at the time of execution of the differential rotation control process 29c, a frequency calculation process 29e for calculating the spline frequency is also executed to set the predetermined differential rotation.

On the other hand, the control unit 29 executes a rotation acceleration calculation process 29f for calculating the rotation acceleration of the second rotation shaft 8, which is an amount of change per unit time of the rotation speed of the second rotation shaft 8, using the second rotation sensor 48. The rotation acceleration thus calculated is used to set the predetermined differential rotation. Details thereof will be described below.

The control unit 29 executes an engagement control process 29d for engaging the sleeve 26 and the pieces 19 and 22 by spline-coupling so that connection switching of the dog clutches 27 and 28 to be connected is performed on condition that the differential rotation ΔN coincides with the predetermined differential rotation. Further, the engagement control process 29d may be started after the differential rotation Δ completely coincides with the predetermined differential rotation, but immediately before the differential rotation Δ coincides with the predetermined differential rotation, the engagement control process 29d may be started to reduce the time.

The means for using the rotation acceleration will be described. The control unit 29 determines that the vehicle is accelerating when it is confirmed that the rotation acceleration of the second rotation shaft 8 obtained by the rotation acceleration calculation process 29f is a positive value. During acceleration of the vehicle, since the sleeve 26 tries to exert a force in its own rotation direction on the pieces 19 and 22, it is desirable that a gap (not illustrated) between the spline teeth 19a and 26a be formed on the rotation direction side. For this reason, when the control unit 29 executes the differential rotation control process 29c while determining that the vehicle is accelerating, the predetermined differential rotation is set so that a relation between the spline frequency F1 and the natural frequency F2 satisfies the following formula.

$$F1 = L \times F2 \, (n < L \leq n+0.5, \, n \text{ is an arbitrary natural number}) \quad \text{[Formula 3]}$$

That is, the differential rotation ΔN is controlled by the engine 2 or the electric motor 4 so that the spline frequency F1 becomes a value obtained by multiplying the natural frequency F2 by a value L within a range at the time of acceleration which is a preset predetermined range. The range at the time of acceleration is a range larger than a natural number multiple (n) and equal to or less than a value (n+0.5) obtained by adding 0.5 to the natural number. In other words, the value L obtained by dividing the spline frequency F1 by the natural frequency F2 is within a range larger than the natural number multiple (n) and equal to or less than a value (n+0.5) obtained by adding 0.5 to the natural number. This makes it possible to perform a shift operation that coincides with the feeling at the time of acceleration.

On the other hand, the control unit 29 determines that the vehicle is decelerating when it is confirmed that the rotation acceleration of the second rotation shaft 8 obtained by the rotation acceleration calculation process 29f is a negative value. During deceleration of the vehicle, since the sleeve 26 tries to exert a force in the direction opposite to the rotation direction on the pieces 19 and 22, it is desirable that a gap (not illustrated) between the spline teeth 19a and 26a be formed on the opposite side of the rotation direction. For this reason, when the control unit 29 executes the differential rotation control process 29c while determining that the vehicle is decelerating, the predetermined differential rotation is set so that a relation between the spline frequency F1 and the natural frequency F2 satisfies the following formula.

$$F1 = L \times F2 \ (n+0.5 < L < n+1, n \text{ is an arbitrary natural number}) \quad \text{[Formula 4]}$$

That is, the differential rotation ΔN is controlled by the engine 2 or the electric motor 4 so that the spline frequency F1 becomes a value obtained by multiplying the natural frequency F2 by a value L within a range at the time of deceleration which is a preset predetermined range. The range at the time of deceleration is a range larger than a value (n+0.5) obtained by adding 0.5 to the natural number multiple and smaller than a value (n+1.0) obtained by adding 1 to the natural number. In other words, the value L obtained by dividing the spline frequency F1 by the natural frequency F2 is a range larger than a value (n+0.5) obtained by adding 0.5 to the natural number multiple and smaller than a value (n+1.0) obtained by adding 1 to the natural number. This makes it possible to perform a shift operation that coincides with the feeling at the time of deceleration.

Incidentally, even when such control is performed, in some cases, the up-lock may occur during the connection switching of the dog clutches 27 and 28. In this case, vibration is generated by the damper mechanism 46 to cause the motor 37 to generate electricity, and the current flowing through the motor 37 has a predetermined amplitude and periodically vibrates with the lapse of time.

The control unit 29 performs detection of the occurrence of the periodic vibration and the acquisition of the frequency at that time by monitoring of the current monitoring unit 51, and executes a frequency storage process 29g for storing the frequency in the storage unit 29a. Incidentally, the frequency storage process 29g is also executed during the execution of the engagement control process 29d. Further, the control unit 29 corrects the value of the predetermined rotation difference on the basis of the frequency stored in the storage unit 29a by the frequency storage process 29g during the execution of the differential rotation control process 29c, and prevents an occurrence of the up-lock.

In the above-mentioned example, although an example of performing the switching from one state to the other state or from the other state to one state of the high-speed state and the low-speed state by the actuator 31 has been described, the present embodiment is also applicable to a case where the driver manually performs the switching. In this case, a manual operation detection unit (not illustrated) is provided on the input side of the control unit 29, and when the manual operation is detected, the above-described series of process is performed.

Further, although an example in which the hub 17 which supports the input gears 18 and 21 in a state of free rotation and integrally rotates is provided on the first rotation shaft 4, the pieces 19 and 22 are integrally formed on the input gears 18 and 21, the sleeve 26 are mounted on the outer periphery of the hub 17, and the output gears 23 and 24 are provided on the second rotation shaft 8 to integrally rotate has been described, this configuration may be reversed.

That is, the hub which supports the output gears 23 and 24 in the state of free rotation and integrally rotates may be provided on the second rotation shaft 8, the pieces may be integrally formed on each of the output gears 23 and 24, the sleeve may be mounted on the outer periphery of the hub, and the input gears 18 and 21 may be provided on the first rotation shaft 4 to integrally rotate.

REFERENCE SIGNS LIST

4 First rotation shaft
8 Second rotation shaft
11 Engine (power source)
12 Motor generator (power source)
19 Piece (target engagement member)
22 Piece (target engagement member)
26 Sleeve (engagement member)
29 Control unit
31 Actuator
37 Motor
42 Damper mechanism (elastic member)
47 First rotation sensor (first rotation speed detection unit)
48 Second rotation sensor (second rotation speed detector)
51 Current monitoring unit

The invention claimed is:

1. A power transmission control device comprising:
a first rotation shaft;
a power source provided to be able to adjust a rotation speed of the first rotation shaft;
a second rotation shaft which rotates in conjunction with an axle;
a first rotation speed detection unit which detects the rotation speed of the first rotation shaft;
a second rotation speed detection unit which detects a rotation speed of the second rotation shaft;
an engagement member which rotates integrally with one shaft of the first rotation shaft and the second rotation shaft and is provided to be movable in an axial direction with respect to the one shaft;
a target engagement member which is provided to be relatively rotatable with respect to the one shaft and rotates in conjunction with the other shaft of the first rotation shaft and the second rotation shaft;
an actuator which operates to move the engagement member in the axial direction; and
a control unit,
wherein the control unit is configured to be able to execute
a differential rotation calculation process for calculating differential rotation between the engagement member and the target engagement member on the basis of the rotation speed of the first rotation shaft detected by the first rotation speed detection unit and the rotation speed of the second rotation shaft detected by the second rotation speed detection unit,
a differential rotation control process for making the differential rotation coincide with a predetermined differential rotation by adjusting a rotation speed of the power source, and
an engagement control process for operating the actuator to establish the engagement between the engagement member and the target engagement member, after the differential rotation coincides with the predetermined differential rotation by the differential rotation control process,
wherein the actuator has an elastic member which is deformed by transmitting a load received by the engagement member, and
wherein the rotation speed of the power source is adjusted so that the differential rotation coincides with the predetermined differential rotation which is set on the basis of a natural frequency generated in conjunction between the actuator and the engagement member by the elastic member, at the time of execution of the differential rotation control process.

2. The power transmission control device according to claim 1,
wherein the engagement member and the target engagement member are configured to engage with each other by spline coupling, and
wherein at the time of execution of the differential rotation control process,
the control unit
executes a frequency calculation process for calculating a spline frequency which is a value obtained by multiplying an absolute value of the difference rotation by the number of spline teeth of the spline coupling, and
sets the predetermined differential rotation so that a value after a decimal point of a value obtained by dividing the spline frequency calculated by the frequency calculation process by the natural frequency does not become 0.

3. The power transmission control device according to claim 2,
wherein the control unit is configured to be able to execute a rotation acceleration calculation process for calculating a rotation acceleration of the second rotation shaft, which is an amount of change per unit time from the rotation speed of the second rotation shaft, and
wherein at the time of execution of the differential rotation control process, the control unit
sets the predetermined differential rotation so that a value obtained by dividing the spline frequency calculated by the frequency calculation process by the natural frequency is greater than a predetermined integer which is one of 0 and a positive integer, and is equal to or less than a value obtained by adding 0.5 to the predetermined integer, when the rotation acceleration of the second rotation shaft calculated by the rotation acceleration calculation process is a positive value, and
sets the predetermined differential rotation so that a value obtained by dividing the spline frequency calculated by the frequency calculation process by the natural frequency is equal to or greater than a value obtained by adding 0.5 to the predetermined integer among 0 and a positive integer and is smaller than a value obtained by adding 1.0 to the predetermined integer, when the rotation acceleration of the second rotation shaft calculated by the rotation acceleration calculation process is a negative value.

4. The power transmission control device according to claim 3,
wherein the actuator has a motor which drives the actuator,
wherein the power transmission control device includes:
a current monitoring unit which monitors a current flowing through the motor; and
a storage unit,
wherein the control unit is configured to be able to execute a frequency storage process for detecting a frequency of the current and storing the frequency in the storage unit, when a periodic vibration having a predetermined amplitude occurs in the current monitored by the current monitoring unit, while operating the actuator so that the engagement member and the target engagement member are engaged at the time of execution of the engagement control process, and
wherein the control unit performs correction of the predetermined differential rotation on the basis of the frequency of the current stored by the vibration storage process, at the time of execution of the differential rotation control process.

5. The power transmission control device according to claim 2,
wherein the actuator has a motor which drives the actuator,
wherein the power transmission control device includes:
a current monitoring unit which monitors a current flowing through the motor; and
a storage unit,
wherein the control unit is configured to be able to execute a frequency storage process for detecting a frequency of the current and storing the frequency in the storage unit, when a periodic vibration having a predetermined amplitude occurs in the current monitored by the current monitoring unit, while operating the actuator so that the engagement member and the target engagement member are engaged at the time of execution of the engagement control process, and
wherein the control unit performs correction of the predetermined differential rotation on the basis of the frequency of the current stored by the vibration storage process, at the time of execution of the differential rotation control process.

6. The power transmission control device according to claim 1,
wherein the actuator has a motor which drives the actuator,
wherein the power transmission control device includes:
a current monitoring unit which monitors a current flowing through the motor; and
a storage unit,
wherein the control unit is configured to be able to execute a frequency storage process for detecting a frequency of the current and storing the frequency in the storage unit, when a periodic vibration having a predetermined amplitude occurs in the current monitored by the current monitoring unit, while operating the actuator so that the engagement member and the target engagement member are engaged at the time of execution of the engagement control process, and
wherein the control unit performs correction of the predetermined differential rotation on the basis of the frequency of the current stored by the vibration storage process, at the time of execution of the differential rotation control process.

* * * * *